United States Patent Office 3,483,053
Patented Dec. 9, 1969

3,483,053
NOVEL METHOD OF SIMULTANEOUSLY SEALING AND INFLATING A RUBBERY PNEUMATIC DEVICE
Charles Orlando Miserentino, Buffalo, Ronald William Peebles, Alden, and Dean Milton Rockwell, Buffalo, N.Y., assignors to Impact Container Corporation, Alden, N.Y., a United States corporation
No Drawing. Filed Dec. 30, 1965, Ser. No. 517,682
Int. Cl. B60c 21/08
U.S. Cl. 156—97          7 Claims

ABSTRACT OF THE DISCLOSURE

Inflation and repair of punctured pneumatic devices such as tires, accomplished by introducing into such pneumatic device a composition comprising a gaseous propellant, such as a Freon, and a urethane modified vegetable oil, such as linseed oil, or an alkyd resin, a suitable solvent for the alkyd resin or urethane, and at least one member selected from the group consisting of lower alcohols, esters, and ketones.

---

This invention relates to a composition of matter useful for inflating and acting as a sealant for pneumatic rubber devices. This invention also relates to a method for simultaneously repairing and inflating a punctured pneumatic device.

Sealing compositions are well known in the art and are ordinarily employed either to prevent air leakage from pneumatic devices such as tires, or as a composition useful in repairing punctures in such devices. These are water-base compositions consisting of elastomeric materials such as natural or synthetic rubber latices, and anti-freezing agents.

These water-base compositions may also contain added amounts of surface active agents or foaming agents such as sodium, potassium or ammonium, cationic soaps of stearic, oleic, palmitic and lauric fatty acid, elastomer latices such as natural or synthetic rubber latices, an anti-freezing agent such as ethylene glycol or an alcohol such as isopropanol and a variety of fillers such as talc, kaolin, clay, bentonite clay and asbestos powder.

Water-base sealant compositions have the disadvantages that the water contained therein acts as a lubricant and prevents adhesion of the sealant to the rubber and furthermore, the soaps and alcohols (both mono- and polyhydroxide) in such compositions tend to promote leaks. The water-base sealants and propellants must be thoroughly shaken before use because the ingredients are not miscible with each other. The solids completely separate and settle at the bottom of the container or agglomerate in a solid or semi-solid mass. In addition, a serious corrosive condition is prevalent within the (steel) container due to partial breakdown of the halocarbons and anti-freeze agents into acidic substances and from the normal corrosive action of water. Such compositions are also not adequately resistant to freezing at temperatures below minus 10° F. All these factors contribute to a poor shelf life of a water-base type product.

The repair of punctured tires usually involves removing the tire from the vehicle, locating the leak, plugging the leak and replacing the tire on the vehicle. In some instances, it is additionally required to remove the tire from the wheel rim to locate and repair the leak, after which the tire has to be remounted on the rim, and the whole assembly has to be placed back on the vehicle. The repaired tire also has to be inflated, which involves an additional step in the repair process and, in some instances, would present some difficulty if a source of compressed gas is not immediately available. It would therefore be a great convenience if tire repair and inflation could be accomplished in one operation. It is to this and other ends that the invention is directed.

It is therefore an object of this invention to provide a novel sealing composition that is useful for not only preventing leaks, but also sealing punctures in rubber pneumatic devices. It is a further object of this invention to provide a method for coating the inner walls of a rubber pneumatic device with such a composition, while simultaneously inflating the device. A further object of this invention is to provide a method and composition for simultaneously sealing and inflating a punctured rubber pneumatic device, such as a tire, without the necessity of locating the damage, and in the case of a tire, without removing the tire, remounting and inflating the tire in separate operations. Additionally, an object of the invention is to provide a method and/or composition for applying a sealant to a rubber pneumatic device, wherein the sealant contains an organic solvent. Another distinct object of the invention is to provide a method for sealing and a composition for application as a sealant to a pneumatic device, wherein the sealant is composed of organic materials that are mutually compatible as a solution within the temperature range of from minus 50° F. to plus 180° F. The foremost object of this invention is to provide an organic solvent in conjunction with a film-forming resin composition which induces a controlled degree of swelling and yet inhibits any deleterious effects to pneumatic devices.

These and other objects of the invention have been achieved by a novel composition and method comprising coating the inner walls of a pneumatic device with a sealant comprising a mixture of a urethane resin, solvent and surfactant by applying the composition with the aid of a hydrocarbon-derived propellant. Such a composition is useful for prevention of leaks as well as simultaneous repair and inflation of punctures.

The urethane resin may be any of the commercially available types commonly used for coatings in the paint industry. Two types of urethane resin are available, the isocyanate-reactive type and the oil-based type. The former has free NCO-reactive groups, whereas in the latter the isocyanate groups are completely reacted during preparation.

The preferred type of urethane resin is a proprietary film-forming material derived from the reaction product of a dying oil ester modified with a polyether glycol and completely reacted with toluene diisocyanate. The resin product is kept in solution with about 40 parts by weight of a solvent such as toluene and the like. The urethane resin employed in the preferred embodiment of the present invention is further described in U.S. Patent 3,022,326 and may be defined as a urethane-modified ethylenically unsaturated vegetable oil having drying properties prepared by bringing into contact and heating a hydrocarbon diisocyanate and a diol system comprising a diol ester of an ethylenically unsaturated higher fatty acid of a vegetable oil with a lower hydrocarbon polyol which is at least trifunctional and a hydrocarbon polyglycol having a molecular weight in the range of from 150 to 2,000, the amount of said polyglycol comprising from 8 percent to 50 percent by weight of the diol system, the amount of diisocyanate employed being substantially equivalent to the total hydroxyl of the diol system, and the amount of diol ester being sufficient to produce a final oil length of 20 percent to 75 percent, the reaction being continued under heating until the resultant urethane-modified oil possess substantially no free isocyanate.

An alkyd-type resin may be employed in place of the urethane-type resin, since the method of preparation and end uses are similar, with exception that in its preparation, phthalic acid is employed in the alkyd system in place of the diisocyanate. Although this alkyd-type resin may be used, the urethane-type described above is preferred. Mixtures of such alkyd and urethane resin may also be employed. Alkyd resins suitable for use in the present invention may be summarized according to the table given below:

genated hydrocarbon and propane equivalents may also be employed as propellants in accord with this invention.

The following non-limiting examples are given as certain preferred embodiments of the invention and are not to be construed as limiting the novel method and composition.

The urethane resin of the following example comprises approximately 60 percent by weight of solids and 40

| Component | 1 | 2 | 3 | 4 | 5 |
|---|---|---|---|---|---|
| Drying oil | Linseed oil | Linseed oil (bodied) | Linseed oil and bodied Linseed oil | Soybean oil | Tall oil. |
| Polyol | Glycerine | Glycerine | Pentaerythriol | Glycerine polyether [1] | Glycerine polyether.[1] |
| Drier | | | (Lead or Cobalt Naphthenates in all cases) | | |
| Solvents | | | (Aromatic or aliphatic in all cases) | | |

[1] The polyether may be a triol having a molecular weight of approximately 1,100, or a polypropylene glycol ranging in molecular weights from 1,000 to 2,500.

The drying oils listed above are transesterified by heating with the polyols. These are in turn heated with phthalic acid in the presence of the selected type of solvent to form carboxylic ester linkages, thus the alkyd system. The similarity of the alkyd resins produced as shown, as compared to the urethane resins, lies in the fact that urethane resins are similarly formed by the mere substitution of toluene diisocyanate in place of the use of phthalic acid and thereby producing urethane linkages in place of the carboxylic ester linkages.

The proportional amounts of organic solvents are selected to control the degree of swelling of the vulcanized natural or synthetic rubber constituents of the pneumatic device.

The solvents used with the resins of this invention, comprising the aromatic solvents such as toluol, xylol or the derivatives of mineral oil, such as the various naphthas and the aliphatic petroleum naphthas such as mineral spirits, have a softening effect on natural and synthetic rubbers. It has been discovered, however, that the effect of such solvents may be substantially controlled by inclusion of alcohols, such as methanol, ethanol, propanol and isopropanol in the resin solution. It has also been discovered that esters, such as ethyl acetate, isopropyl acetate, and ketones, such as acetone and methyl ethyl ketone, have the same effect as the alcohol. These three classes of organic compounds (i.e., alcohols, esters and ketones) also act as solvents for the urethane resin solution and its equivalents, and also lower the freezing point of the solution. These esters, ketones and alcohols may be defined as inhibition solvents and are characterized further by their low molecular weight. Specifically, of these inhibition solvents, the suitable esters have from 2–10, preferably, 2–8, carbon atoms, the alcohols 1–5, preferably 1–4, carbon atoms, the ketones 3–11, preferably 3–9 carbon atoms, isomers of these esters, alcohols and ketones, or any combination thereof.

A wide variety of surfactants are commercialy available and are useful within the purview of this invention; both nonionics and anionics are considered to be preferred. These are exemplified by alkyl phenyl ethers of polyethylene glycols and polyoxyalkylene condensation products.

The hydrocarbon-derived propellants comprise the halocarbon types and/or hydrocarbon types such as propane and its equivalents. The chemical composition of the halocarbon propellants used within the scope of this invention are trichloromonofluoromethane, dichlorodifluoromethane and monochlorodifluoromethane and their art-recognized equivalents.

The equivalents of the propane utilized in accord with the present invention include methane, ethane, butane, cyclopropane and cyclobutane, all of which may be substituted for the propane of the examples to varying degrees, since these equivalents will increase or decrease the pressure of the composition in the container, depending on the specific material employed. It is also to be noted that any combination of the propane, halopercent by weight of toluol. Other solvents, such as xylol, benzene and the like may also be used. The urethane resin used is prepared according to Example I of U.S. Patent 3,022,326.

EXAMPLE I

A solution is prepared comprising

| | Parts by weight |
|---|---|
| 60% urethane resin solution | 31.66 |
| Isopropopanol | 3.77 |
| Isopropyl acetate | 2.42 |
| Toluene | 3.02 |
| NPX Tergitol [1] | 0.24 |
| Freon 12/propane (91/9) | 58.89 |
| Total | 100.00 |

[1] A commercial nonionic surfactant which is an adduct of nonyl phenyl and ethylene oxide having an apparent specific gravity of 1.063, a solidification temperature of 5 to 7° C. and a flash point of 550° F.

The liquid mixture consisting of the first five items listed in Example I are weighed into the appropriate container which is then sealed with an aerosol type valve. Following this, the prescribed amount of propellant is then introduced. The contents of the pressurized container are then ready (with adequate attachments) for discharge into a tire through the tire or tube valve. Thusly, the composition coats the inner surfaces of the tubeless tire or inner tube and provides an effective sealant coating while inflating the tire.

No separation of the solute is noted over a temperature range from minus 50° F. to plus 180° F.

EXAMPLE II

Example I is repeated using the following composition:

| | Parts by weight |
|---|---|
| 60% urethane resin solution | 32.72 |
| Isopropanol | 3.89 |
| Isopropyl acetate | 2.50 |
| Toluene | 3.15 |
| NPX Tergitol [2] | 0.24 |
| Freon 22/propane (96/4) | 57.50 |
| Total | 100.00 |

[2] A commercial nonionic surfactant which is an adduct of nonyl phenyl and ethylene oxide having an apparent specific gravity of 0.063, a solidification temperature of 5 to 7° C. and a flash point of 550° F.

Substantially the same results are obtained as those in Example I.

EXAMPLE III

Example I is repeated, however, with the substitution of approximately 2.5 parts of acetone in one instance and 2.5 parts methyl ethyl ketone in another instance in place of isopropyl acetate, and substantially the same results are obtained as in Example I.

EXAMPLE IV

Example I is repeated, however, with the substitution of an aliphatic petroleum naphtha designated Mineral Spirits V.M. and P. (Varnish Makers and Paints) in one instance and Stoddard Solvent in another instance, and substantially the same results are obtained as in Example I.

EXAMPLE V

Example I is repeated, however, with the substitution of an alkyd-type resin in place of the urethane resin, and substantially the same results are obtained as in Example I. The alkyd resin is substantially identical to the urethane resin of Example I, with the exception that phthalic acid is used in place of the isocyanate in its manufacture.

Although the invention has been described with respect to various specific embodiments, it has been found that operable compositions can be prepared utilizing the novel compositions as cited in Examples I, II and V, with variations as shown below:

Urethane or alkyd-type resins—From 0.5 to 300% of the amount indicated
Low molecular weight alcohol—From 0 to 300% of the amount indicated
Low molecular weight ketone—From 0 to 300% of the amount indicated
Low molecular weight ester—From 0 to 300% of the amount indicated
Surfactant—From 0 to 300% of the amount indicated
Hydrocarbon derived propellant—From 0 to 300% of the amount indicated The compositions of this invention may also include an inert filler, such as mica, clay, talc, bentonite, bentone, finely divided silica and various combinations thereof in amounts ranging from 0 to 50 parts by weight added to the ingredients shown in Examples I, II and V.

Thus, there have been described novel sealant compositions and a method for applying said sealants as a coating for a pneumatic rubber device, such as a tire. The compositions of this invention are also useful for the simultaneous repair and inflation of such devices.

Although the invention has been described with reference to certain preferred embodiments, it is not intended that the invention be limited thereby, and certain modifications of the novel compositions and methods are intended to be included within the broad scope of the invention, as embodied in the following claims.

What is claimed is:
1. Method of sealing a rubbery pneumatic device and simultaneously inflating such device, which method comprises introducing into such device a combination of an effective amount of up to about 52 parts by weight of at least one resin selected from the group consisting of urethane modified vegetable oils and alkyds; an effective amount of up to about 12.5 parts by weight of at least one member selected from the group consisting of lower aliphatic alcohols, lower aliphatic ketones, and lower aliphatic esters; an effective amount of up to about 0.72 part by weight of at least one anionic or nonionic surfactant; an effective amount up to about 47 parts by weight of at least one solvent for said resin; and at least one hydrocarbon derived propellant.

2. Method described in claim 1, wherein said urethane modified vegetable oil comprises the reaction product of a drying oil ester modified with a polyethylene glycol and completely reacted with toluene diisocyanate.

3. Process claimed in claim 2, wherein said resin has a molecular weight of about 150 to 2,000.

4. Method claimed in claim 1, wherein said alcohol, ester and ketone are selected from the group consisting of methanol, ethanol, n-propanol, isopropanol, ethyl acetate, isopropyl, acetate, acetone and methyl ethyl ketone.

5. Method claimed in claim 1 wherein said propellant is at least one member selected from the group consisting of trichloromonofluoromethane, dichlorodifluoromethane and monochlorodifluoromethane.

6. Method claimed in claim 1, wherein said solvent is at least one member selected from the group consisting of toluol, xylol and benzene.

7. Method claimed in claim 1, wherein said composition contains up to about 50 parts of at least one inert filler.

References Cited

UNITED STATES PATENTS

| | | | |
|---|---|---|---|
| 3,096,001 | 7/1963 | Boe et al. | 260—77.5 X |
| 3,022,326 | 2/1962 | Schroeder et al. | 260—18 X |
| 2,991,629 | 7/1961 | Rose. | |
| 2,970,123 | 1/1961 | Rhodes et al. | 260—22 |

FOREIGN PATENTS 249,756  2/1964  Australia.

OTHER REFERENCES

Science News Letter, vol. 78, No. 336, November 1960, p. 336.

DONALD E. CZAJA, Primary Examiner

C. WARREN IVY, Assistant Examiner

U.S. Cl. X.R.

106—33; 141—38; 161—190; 260—18, 22, 31.2, 32.8, 33.4